Dec. 26, 1939.  G. G. KRUESI  2,184,306
RADIO DIRECTION FINDER
Filed Sept. 30, 1936
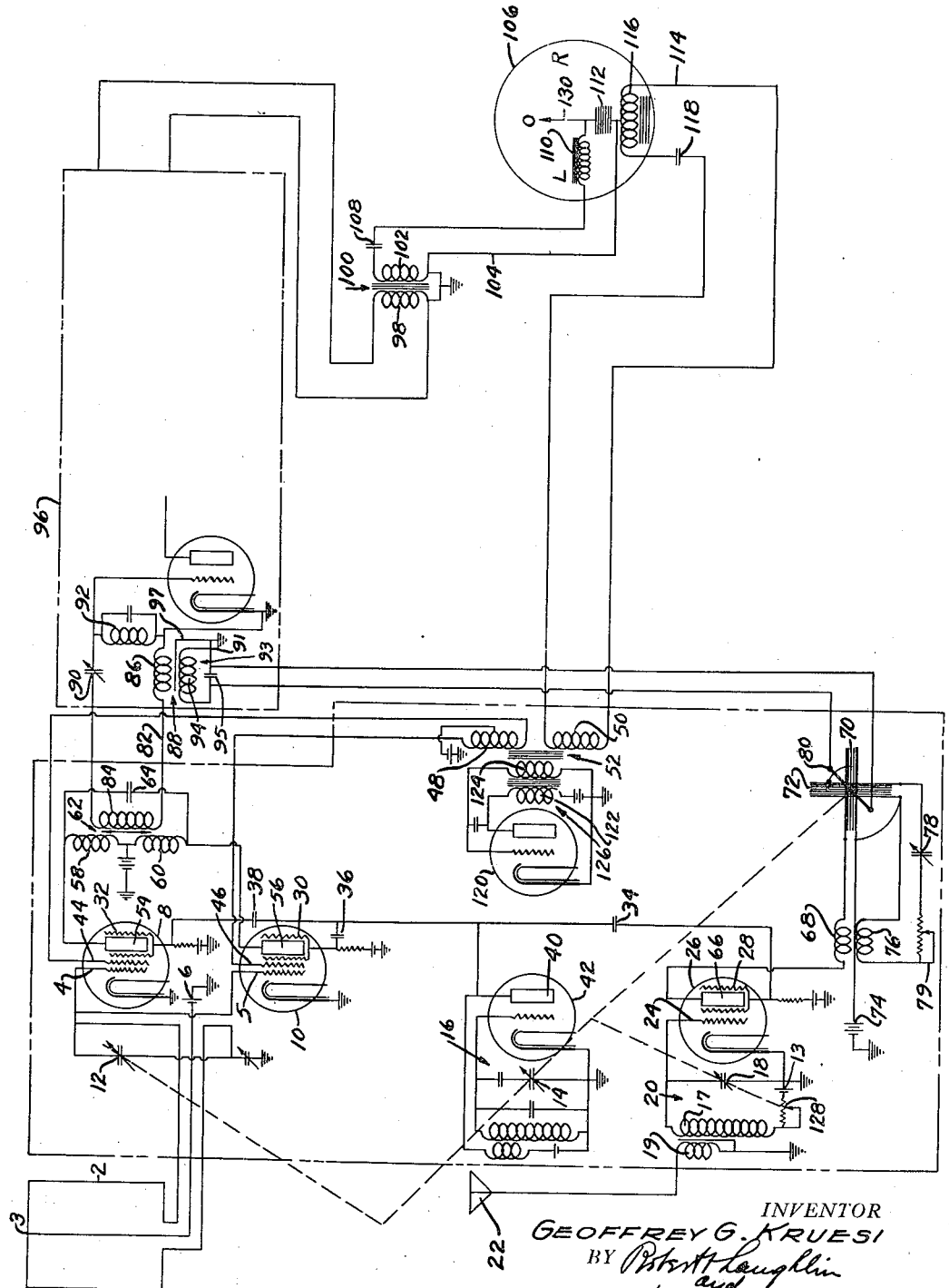
INVENTOR
GEOFFREY G. KRUESI
BY Robert Laughlin
and
Wade Koontz
ATTORNEYS Patented Dec. 26, 1939

2,184,306

UNITED STATES PATENT OFFICE 2,184,306

RADIO DIRECTION FINDER

Geoffrey G. Kruesi, Dayton, Ohio

Application September 30, 1936, Serial No. 103,324

14 Claims. (Cl. 250—11)

(Granted under the act of March 3, 1883, as
amended April 30, 1928; 370 O. G. 757)

The invention described herein may be manufactured and used by or for the Government for governmental purposes, without the payment to me of any royalty thereon.

My invention pertains to improvements in radio direction finding apparatus, in particular radio direction finding apparatus, in particular radio homing devices for determining the direction of arrival of radio waves in the horizontal plane that is especially adaptable for use as a guide to the pilot of aircraft whereby such aircraft may be directed in the direction of and in landing on a landing field during periods of low visibility such as fogs, rains, blizzards and storms.

Broadly the invention relates to a novel circuit system in a visual type radio compass with right and left visual indications in which directional and non-directional effects of loop and vertical antennae are brought into phase by means of a goniometer type phase shifting device.

It is well known in the art that radio direction finding systems can be employed which in order to produce visually right or left indications use a directional antenna such as a loop aerial and a non-directional antenna such as a vertical mast. Under certain conditions the combination of the effects of the loop and vertical antennae results in a cardioid which for the present type compass is caused to reverse its polarity periodically and alternately. An important factor in the use of loop and vertical antennae when the antennae effects are to be combined is a provision of means to shift the phase of the output of either antenna to approximately coincide with the phase of the output of the other since if the vertical antenna is located at the center of the loop and both loop and vertical antennae are tuned to resonance, the output current of the loop will be in phase quadrature to the output current of the vertical antenna, and the sum of the currents will be the same regardless of the phase polarity that is chosen between the currents of the two antennae.

A further requirement that has to be met in order to assure maximum sensitivity is that the physical dimensions of loop and vertical antenna are so chosen that the maximum current amplitudes of both the directional and non-directional antennae are equal in two directions essentially 180° apart and lying in the plane of the loop aerial. In my co-pending applications Nos. 699,719 filed Nov. 25, 1933, Patent No. 2,142,133 dated Jan. 3, 1939 and 5,566 filed Feb. 8, 1935, novel means are disclosed to bring about the correct phase and amplitude relations between loop and antenna currents over required frequency ranges so as to obtain cardioid characteristics which periodically reverse their directional sense without changing their form during reversals in order to obtain a 180° accuracy between front and rear bearings consistent with maximum obtainable sensitivity over said required frequency range.

In order to obtain a true cardioid, it is essential, first, that the antenna be tuned to resonance so as to carry current in phase with the induced antenna voltage and have a suitable amplitude, second, that the loop be tuned to resonance so that the loop current will be in phase with the induced voltage in the loop and that the maximum amplitude of the loop be equal to that of the antenna and, third, that the tuned antenna and loop circuits be coupled in such a manner that the resulting currents of the antenna and loop present in the third collective circuit are in phase with respect to one another.

When radio devices of this character are used in airplanes or other small craft it is found impracticable to employ sufficiently large antennae to obtain resonance so that with the use of smaller antennae the circuit is highly capacitively reactive and the antenna current will be considerably leading with respect to the induced antenna voltage. Since the magnitude of antenna current received depends on the ratio of induced antenna voltage over the antenna impedance and said impedance is some function of the frequency of the incoming wave, it follows that the above-mentioned phase relation between antenna voltage and current is also a function of frequency. This function is non-linear and depends primarily upon the height of the antenna, and correspondingly upon its resistance, inductance and capacity. Obviously if the antenna current for a given frequency is leading by an angle depending upon the electric constants of the antenna, said antenna current will induce through inductive coupling a voltage in the third or collective resonant circuit, which will lag behind the original induced voltage of the antenna circuit by an angle of 90°, minus the leading angle existing between antenna current and the original induced antenna voltage. If to said third or collective circuit there is an inductively coupled loop circuit, then the induced loop voltage in said collective circuit (assuming a phase polarity of the original induced loop voltage with respect to the original induced antenna voltage, which is 90° leading) is 90° lagging behind the original induced antenna voltage, provided that said loop circuit is tuned to resonance. Therefore, the phase difference between the respective induced voltages of loop and antenna circuit that exists in said collective circuit is equal to 90° minus the leading angle existing between the induced antenna current and antenna voltage. It has been shown in my copending application No. 699,719 that it is possible to compensate for said phase difference by properly choosing a coupling coefficient relation between loop, antenna, and collective circuits respectively which permits the variation of the reactance adjustment of the loop circuit with a corresponding shift in phase of the loop current relative to the induced loop voltage without thereby affecting the original phase conditions in the antenna circuit with the result that the induced loop and antenna voltages are brought into phase respectively in the collective circuit.

It is now the object of this invention to introduce a novel phase shifting means when considered in combination with radio compasses of this character. It is well known in the art that if two stationary coils of a radio goniometer which are physically displaced respectively by 90°, are fed with currents of equal amplitude and frequency but having an existing phase difference between them of 90°, an electromagnetic rotating field is produced. This field has a constant amplitude over the entire range of 360°. If a search coil is placed within said stationary coils and is being mounted such that it may be rotated about an axis, then the currents induced in said search coil will change the relative phase with respect to the currents present in said stationary coils as the search coil is being rotated. The magnitude of phase variation depends upon the degree of rotation of the search coil relative to the stationary coils. It is therefore possible to produce a phase shift of the non-directional antenna current by connecting the stationary coil system of said radio goniometer to said antenna circuit and the search coil of the radio goniometer, which forms an output circuit for the non-directional antenna to the already mentioned third or collective circuit. The loop circuit on the other hand may be conveniently tuned to resonance and likewise be coupled to said collective circuit. As has already been stated and fully explained in my copending application Serial No. 699,719, it is essential to resort to coupling arrangements between antenna, loop and collective circuit, which tend to reduce the interaction between loop and antenna circuits to a minimum. In this particular invention, this has been accomplished by resorting to coupling elements consisting of screen grid type pentode vacuum tubes. A beat frequency oscillator is employed and suitably interposed between loop and antenna circuits in order to thereby produce an intermediate frequency in the third collective circuit, the output of which may now be connected to any radio receiver which is adjustable to said intermediate frequency. It has heretofore been necessary to take special precautionary measures in maintaining the sense of reactance adjustment of the loop circuit relative to that of the receiver circuit the same, consistent with an in-phase or out of phase condition of loop and antenna voltages that were induced in the receiver circuit over the frequency range to which said receiver and loop circuit is tunable. This has been found to be a difficult task in the past because the problem consisted in matching the frequency characteristic of the loop circuit with that of the receiver circuit. The electric constants of both are inherently and by reason of their entirely different nature, different from each other. It was therefore impossible to resort to any arbitrary type of receiver as long as the specifications for a loop circuit were laid down. The present invention eliminates this undesirable feature in that any type of receiver on hand may be employed by letting it perform the function of an intermediate frequency amplifier. I have shown in U. S. Patent No. 1,868,945, copending applications Nos. 699,719 and 5,566, that it is possible to indicate the phase reversal of loop currents by the use of a balanced modulator circuit of either the "conjugate" or the "common" input type. In the most practical form the balanced modulator circuit has been operated at a high speed of alternation so that the alternate addition and subtraction of the loop and antenna outputs have produced a modulation of the carrier applied at an audio frequency to the radio receiver. The phase of the audio frequency current derived from the output of the receiver is then compared with the phase of the audio frequency current employed to actuate the balanced modulator circuit by means of an alternating current type dynamometer instrument, the latter of which is capable of indicating relative plus or minus phase polarities existing between said audio frequency currents. This polarity is employed as an indication of the relative direction of deviation of the direction of arrival of radio waves from that of a normal of the plane of the loop.

Since a phase reversal may be obtained by reversing the side band frequencies from either the loop or antenna output it is necessary to supply either side band frequency output with a carrier frequency output of the other antenna in order to obtain a detected audio component having the fundamental frequency of the audio oscillator which actuates the balanced modulator circuit. It has been difficult in the past to adjust the amplitude of said carrier to that of the side bands in order to obtain true cardioid characteristics for a given range of frequencies. This is due to the fact that the respective effective heights of loop and antenna reception means do not vary likewise with the frequency of the received radio waves. It is therefore a further object of this invention to provide means to vary the current amplitude of the antenna circuit output without thereby effecting a phase variation between the current and voltage of said antenna, in order to arrive in connection with the above-described phase shifting means at cardioid characteristics for all frequencies to which the radio compass is tunable.

The invention itself, however, both as to its organization and method of operation, together with further objects and advantages, will best be understood by reference to the following description when read in connection with the accompanying drawing, in which:

The figure is a schematic diagram of a circuit arrangement embodying my invention. As illustrated in the circuit systems shown in the drawing, a directional loop antenna 2 is shown to be directly coupled to the control grids 4 and 5 of pentode vacuum tubes 8 and 10, the grids being connected in parallel respectively. The mid tap 3 of loop 2 is shown to be grounded over "C" battery 6. The loop circuit is tunable to the incoming radio waves by means of a condenser 12, which in turn is commonly and mechanically coupled to a condenser 14 of a beat frequency oscillator 16 and a condenser 18 of a tuned circuit 20. Said tuned circuit 20 is inductively coupled to a non-directional antenna 22 by means of an antenna coupling coil 19 and directly coupled to the control grid 24 of screen grid vacuum tube 26. An electrostatic shield is imposed between said antenna coupling coil 19 and secondary coil 17 of tuned circuit 20. The circuit 20 is shown to include a potentiometer 129 and a "C" battery 13. The screen grids 28 of vacuum tube 26, 30 of vacuum tube 10, and 32 of vacuum tube 8 are capacitively coupled by means of condensers 34, 36 and 38 to the plate electrode 40 of vacuum tube 42 of the beat frequency oscillator 16. The suppressor grids 44 and 46 of vacuum tubes 8 and 10 respectively are shown to be connected to one of two balanced tertiary windings 48 and 50 of audio frequency oscillation transformer 52. The plate electrodes 54 and 56 of vacuum tubes 8 and 10 respectively in turn are connected to coils 58 and 60 of intermediate frequency transformer 62 in a fashion common to a balanced modulator circuit which in this instance is of the conjugate input type. The circuit consisting of coils 58 and 60 and fixed condenser 64 is tuned to an intermediate frequency which normally is equal to the difference between the frequency of the incoming radio wave and the frequency to which the beat frequency oscillator 16 is tuned. The plate electrode 66 of vacuum tube 26 is shown to be connected to the coupling coil 68, and to stationary goniometer coil 70, and plate battery 74. The current flowing in said circuit is of the intermediate frequency by reason of the fact that the beat frequency oscillator potential of beat frequency oscillator 16 is superimposed upon screen grid 28 of vacuum tube 26. The secondary coil 76, stationary goniometer coil 72 and fixed capacity 78 are so adjusted that the current flowing therein and being of an intermediate frequency is in phase quadrature with the current flowing in circuits 68, 70 and 74. The rotatable search coil 80 is set at such an angle relative to the stationary coils 72 and 70 to result in a phase shift of the current flowing therein to bring about an in-phase condition between currents of the loop antenna 2 and the non-directional antenna 22. The coupling circuit 93 consisting of fixed capacity 95 and coupling coil 94 is also tuned to the intermediate frequency. An electrostatic shield 97 interposed between coils 86 and 94 is grounded in common with one terminal of coil 94 at point marked 91. A collective circuit 82 consisting of the secondary winding 84 of the intermediate frequency transformer 62, coupling coil 86 of coupling transformer 88, capacity 90, and tuned intermediate frequency circuit 92 carries currents from both the loop antenna and vertical antenna, said currents being respectively of the intermediate frequency. The audio frequency output of the intermediate frequency receiver 96 is shown to be connected to the primary winding 98 of audio frequency transformer 100. The secondary winding 102 of said transformer is connected to the moving coil circuit 104 of a dynamometer type indicator 106 and consists of fixed capacity 108, phase reactor 110, and moving coil 112 of indicator 106.

The field coil circuit 114 consists of field coil 116, fixed tuning capacity 118, and tertiary coil winding 50 of oscillation transformer 52, said transformer is connected to triode vacuum tube 120, the respective grid and plate electrodes thereof being connected to coils 124 and 122.

In regard to the operation of my invention, as shown in Fig. 1, the audio frequency oscillator 126 induces upon the suppressor grids 44 and 46 of vacuum tubes 8 and 10 respectively by means of the tertiary winding 48 an alternating current potential of sufficient magnitude to render the characteristics of vacuum tubes 8 and 10 linear. Assuming the alternating potential on plate electrode 54 of vacuum tube 8 to be positive, intermediate radio frequency energy will flow through winding 58 of intermediate frequency transformer 62. This energy consists of two side band frequency currents that are of a directional character in that phase polarity and amplitude of said side band frequency currents are dependent upon the direction of the incoming radio waves with respect to the normal of the plane of the loop. Said currents will induce a corresponding electromotive force in the collective circuit 82.

Considering now the current supplied by the non-directional antenna 22, said current flowing through the antenna coupling coil 19 will induce in the secondary coil 17 of the tunable circuit 20 an electromotive force which is lagging 90° behind said antenna current. If said tunable circuit 20 is tuned to resonance, it follows that the current flowing therein will be in phase with said induced electromotive force. The relative phase difference between the current flowing in tunable circuit 20 and the induced electromotive force of antenna 22 will therefore be equal to 90° minus the existing angle between the induced antenna voltage and its current. The output current of vacuum tube 26 flowing respectively in the plate circuit thereof will suffer an additional phase shift depending upon the internal resistance of vacuum tube 26 and the load impedance represented by coupling coil 68 and stationary goniometer coil 70. Remembering now that the induced loop voltage is in phase quadrature to the induced antenna voltage and assuming the phase polarity between said voltages which depends upon the direction of the incoming radio waves with respect to the normal of the plane of the loop to be such that the induced loop electromotive force is 90° leading with respect to the induced antenna voltage, it can be shown that the currents flowing respectively in the output circuits of loop and antenna are not necessarily in phase coincidence. Therefore, under these conditions no cardioid characteristic will be obtained when combining the two antenna effects because of the phase difference of 90° plus or minus whatever angle may exist between the respective antenna currents. As already described, the plate circuit of vacuum tube 26 with its associated load impedance consisting of coupling coil 68 and stationary goniometer coil 70 is coupled into a second stationary goniometer coil 72 by means of the secondary coupling coil 76. The impedance of the circuit consisting of goniometer coil 72 and coupling coil 76 is made either capacitively or inductively reactive in order to render the two respective currents flowing in goniometer coils 72 and 70 effectively 90° out of phase. With the provision that said currents may be adjusted to have equal amplitudes, for instance, by varying the resistor 79, and furthermore that the condition of a 90° phase difference between the currents flowing in coils 72 and 70 is established by properly adjusting condenser 78, then there will be produced within said stationary goniometer coils a rotating electromagnetic field. The voltage induced in search coil 80 of the goniometer remains constant as the search coil is being turned through an arc of say 360°. However, its phase with respect to the currents flowing in either of the stationary coils 72 and 78 will vary during the process of rotation. Therefore, the current which is caused to flow in the associated coupling circuit 93 will likewise vary its phase so that it can be said that the voltage induced by said current in the collective circuit 82 may be varied with respect to the induced voltage of the loop coming from the output circuit of its associated balanced modulator circuit. It is therefore possible to bring about an in-phase condition between the intermediate frequency side bands of the loop circuit and the intermediate frequency energy coming from the non-directional antenna respectively in the collective circuit 82 by properly adjusting the physical position of the search coil 80 with respect to the stationary coils 78 and 72 of the goniometer type phase shifting device.

By suitably adjusting potentiometer 128, the respective current amplitudes may be made alike in order that the combination of the loop and antenna effects will result in a true cardioid characteristic. Since there exists a certain relation between effective height of the loop antenna and the non-directional antenna and since said relation does not remain constant for a given range of frequencies, it is desirable to mechanically connect said potentiometer 128 and the search coil 80 of the phase shifting device together with tuning condensers 18, 14 and 12 in such a manner that for each frequency to which the compass circuit is tuned an in-phase condition between respective loop and antenna currents, as well as equality in current amplitudes is obtained when considered for the direction of the incoming radio waves which is coincident with the direction of the plane of the loop. Whereas phase shifting means of the network type have heretofore been proposed, said means are not practical where the phase shift has to be varied in order to overcome the effects of unequal reception characteristics of loop and antenna aerials as the frequency of the incoming radio wave is varied. In order to perform this task successfully it is necessary to effect certain definite simultaneous phase and amplitude variations in either loop or antenna circuit. Since the adjustments of potentiometer 128 and search coil 80 that are necessary to bring about this ideal condition are only of a minor magnitude over a given frequency range, it follows that the rotation of 180° of tuning condensers 12, 14 and 18 covering a given band of frequencies must be mechanically reduced to a comparatively small rotation of the moving arm of the potentiometer 128 and the rotatable search coil 80 of the goniometer type phase shifting device to obtain the desired ratio of angular adjustment of potentiometer and search coil with respect to said condensers 12, 14 and 18. Said ratio depends in a measure upon the ratio of maximum to minimum frequency value, or in other words upon the frequency range of the receiving apparatus and becomes greater as said frequency range is increased. Since coils 58 and 60 carry periodically and alternately at the rate of audio frequency modulation of audio oscillator 126 the side bands produced from the intermediate carrier by the action of the balanced modulator, and coil 94 carries current from the non-directional antenna 22 the addition of the two currents in the common collective circuit 82 produces a modulated carrier of intermediate frequency which is supplied to the receiver 96.

It is well known in the radio art that the phase of the audio envelope produced by the combination of the carrier and two side bands may be reversed 180° by either the reversal of the phase of the carrier current or by the reversal of the phase of the side band currents provided, however, that the latter are not in phase quadrature with the carrier current. The side bands being of different frequencies from each other and from the carrier as well, during a small period of time which is small in comparison with the length of the modulation cycle have a definite phase relation. For example, if the two side bands both pass through a maximum on that part of the modulation cycle when the carrier is passing through zero, it can be shown that in this instance the side bands and the carrier are in phase quadrature. The resultant modulating envelope in this case is of double the modulating frequency of audio frequency oscillator 126. On the other hand, if the side bands pass through a simultaneous maximum when the carrier is passing through a maximum likewise, and having the same polarity respectively, then both side bands and the carrier may be said to be effectively in phase and the resulting audio envelope will be of the original modulation frequency of audio frequency oscillator 126. Since the phase of the side bands is reversed when the phase of the intermediate frequency current existing in coils 58 and 60 is reversed by altering the direction of the incoming radio wave passing from one side of the normal of the plane of the loop antenna to the other, it may be seen that the phase polarity of the audio envelope of the intermediate frequency currents flowing in the collective circuit 82 and applied to receiver 96 will be an indication of the direction of the incoming radio waves.

Since the directional indication is based upon a measurement of the magnitude as well as the phase of the fundamental component of the modulation produced by the balanced modulator circuit and because the relative magnitude of the fundamental components of the modulation is dependent upon the effective phase relation existing between the side bands and carrier frequency currents, the accuracy of indication is in a measure dependent upon the maintenance of the constant phase relation from the two respective directional and non-directional antennae through to the point of combination in the collective circuit 82. The circuit from the first intermediate frequency amplifier of receiver 96 to the audio output of audio frequency transformer 100 is not new and typical of any of the existing radio receiver circuits, which are employed for radio telephone reception. The audio output of the receiver is shown to be connected to a tuned audio frequency moving coil circuit consisting of secondary winding 102, fixed capacity 108, phase reactor 110, and moving coil 112 of the dynamometer type indicator 106. The purpose of the phase reactor 110 has been fully described in my copending U. S. application Serial No. 5,566. Since the audio frequency output from the receiver produced by the modulating action of the balanced modulator circuit is in synchronism with the audio frequency output of audio frequency oscillator 126 transferred respectively through one of the tuned tertiary coils 50 over capacity 118 to the field coil 116 of the indicating instrument 106 and since the phase polarity of the audio frequency output from the receiver produced by the balanced modulator circuit is a function of the direction of the incoming radio waves, it will either add to the audio frequency current derived directly from the audio frequency oscillator 126 on one half of the modulation cycle and subtract on the other half of the modulation cycle, thereby producing a deflection of the indicator needle 130 of the indicator 106, the magnitude of which is proportional to the magnitude of the audio frequency output of the receiver and the current derived directly from the audio frequency oscillator 126.

I claim:

1. In a directional antenna system, a directional antenna means having a tunable means, a non-directional antenna means, a tunable collective circuit having its input connected to both said antenna means through two different channels and variable phase shifting means in one of said channels for varying the phase relation between the voltage and current in said channel while maintaining the voltage constant, and means connecting said tunable means and phase shifting means to operate in unison and simultaneously compensate for relative variations in the phase of the currents in said antenna means with changes in frequency of the received signal.

2. In a directional antenna system, directional antenna means having a tunable means, a non-directional antenna meas having a tunable element, a tunable collective circuit having its input connected to both said antenna means through two different channels, and variable phase-shifting means in one of said channels for varying the phase relation between the voltage and current in said channel while maintaining the voltage constant, and means connecting said tunable element, said tunable means, together with said phase shifting means, to operate in unison and simultaneously compensate for relative variations in the phase of the currents in said antenna means with changes in frequency of the received signal.

3. In a direction finding device, a directional antenna means having a tunable means, a non-directional antenna means having a tunable means, an amplifying system tuned to an intermediate frequency having its input connected to both said antenna means through two different channels, means for locally producing a current having a known and variable frequency differing from the frequency of the received radio waves by said intermediate frequency and having constant amplitude, tunable means associated with said local means, means for combining said locally produced current with the currents received by both said antenna means to thereby produce resulting currents, respectively, corresponding to said intermediate frequency, a balanced modulator circuit in one of said two channels, a variable phase-shifting means in one of said two channels, a second local means to produce a current of constant frequency and amplitude, means combining the intermediate frequency current of one of said antenna means with said second locally produced current to produce currents having frequencies equal to the sum and difference of said second locally produced current and that of the intermediate frequency current, means for combining said sum and difference frequency currents of the one antenna means with the intermediate frequency current of the other antenna means to produce a current having a frequency of said second local means, the phase and amplitude of which is a function of the direction of the incoming radio wave, and means connecting the tunable elements of both said antenna means, said first local means, together with the phase-shifting means, to operate in unison and simultaneously compensate for relative variations in phase of the currents in said antenna means with changes in frequency of the received signal over a plurality of frequency ranges, respectively.

4. In a directional antenna system, a directional antenna means having a tunable means, a non-directional antenna means, a tunable collective circuit having its input connected to both said antenna means through two different channels, a local means to produce currents of a known frequency and constant amplitude, indicating means connected to the output of said tunable collective circuit and said local means, reversing means in one of said channels for alternately periodically reversing the antenna effect, variable phase-shifting means in one of said channels for varying the phase relation between the voltage and current in said channel while maintaining the voltage constant to thereby compensate for relative variations in phase of the currents in said indicating means and local means with changes in frequency of the received signal.

5. In a directional antenna system, a directional antenna means having a tunable means, a non-directional antenna means having a tunable means, a tunable collective circuit having its input connected to both said antenna means through two different channels, a local means to produce current of a known frequency and constant amplitude, indicating means connected to the output of said collective circuit and said local means, reversing means in one of said channels for alternately periodically reversing the antenna effect, variable phase-shifting means in one of said channels for varying the phase relation between the voltage and current in said channel while maintaining the voltage constant, means connecting the tunable means of said antennae with said phase shifting means to operate in unison and simultaneously compensate for relative variations in phase of the currents in said indicating means and local means with changes in frequency of the received signal.

6. In a directional antenna system, a directional antenna means having a tunable means, a non-directional antenna means having a tunable means, a tunable collective circuit having its input coupled to both said antenna means through two different channels, so that the coupling coefficient between said antenna means is substantially smaller than the coupling coefficient of either of said antenna means and said tunable collective circuit, a local means to produce currents of a known frequency and constant amplitude, indicating means connected to the output of said collective circuit and said local means, reversing means in one of said channels for alternately periodically reversing the antennae effect, variable phase-shifting means in one of said channels for varying the phase relation between the voltage and current in said channel while maintaining the voltage constant, means connecting the tunable means of said antennae, together with said phase shifting means to operate in unison and simultaneously compensate for relative variations in phase of the currents in said indicating means and local means with changes in frequency of the received signal.

7. In a direction finding device, a directional antenna means having a tunable means, a non-directional antenna means, an amplifying system tuned to an intermediate frequency having its input connected to both said antenna means through two different channels, a balanced modulator circuit in one of said two channels, a variable phase-shifting means in one of said two channels, means for locally producing a current having a known and variable frequency differing from the frequency of the received radio waves by said intermediate frequency and having constant amplitude, tunable means associated with said local means, means for combining said locally produced current with the currents received by both said antenna means to thereby produce resultant currents respectively corresponding to said intermediate frequency, a second local means to produce a current of constant frequency and amplitude, means combining the intermediate frequency currents of one of said antenna means with said second locally produced current to produce currents having frequencies equal to the sum and difference of said second locally produced current and that of the intermediate frequency current, means for combining said sum and difference frequency currents of the one antenna means with the intermediate frequency current of the other antenna means to produce a current having a frequency of said second local means, the phase and amplitude of which is a function of the direction of the incoming radio wave, and means connecting the tunable element of one of said antenna means, said first local means, together with the phase-shifting means, to operate in unison and simultaneously compensate for relative variations in phase of the currents in said antenna means with changes in frequency of the received signal over a plurality of frequency ranges, respectively.

8. In a direction finding device, a directional antenna means having a tunable means, a non-directional antenna means having a tunable means, an amplifying system tuned to an intermediate frequency having its input connected to both said antenna means through two different channels, means for locally producing a current having a known and variable frequency differing from the frequency of the received radio wave by said intermediate frequency and having constant amplitude, tunable means associated with said local means, means for combining said locally produced current with the currents received by both said antenna means to thereby produce resulting currents, respectively, corresponding to said intermediate frequency, a balanced modulator circuit in one of said two channels, a variable phase-shifting means in one of said two channels, a second local means to produce a current of constant frequency and amplitude, means for combining the intermediate frequency current of one of said antenna means with said second locally produced current to produce currents having frequencies equal to the sum and difference of said second locally produced current and that of the intermediate frequency current, means for combining said sum and difference frequency currents of the one antenna means with the intermediate frequency current of the other antenna means to produce a current having a frequency of said second local means, the phase and amplitude of which is a function of the direction of the incoming radio wave, indicating means connected to the output of said amplifying system and said second local means, and means connecting the tunable elements of both of said antenna means, said first local means, together with the phase-shifting means, to operate in unison and simultaneously compensate for relative variations in phase of the currents in said indicating means and second local means with changes in frequency of the received signal over a plurality of frequency ranges, respectively.

9. In a direction finding device, a directional antenna means having a tunable means, a non-directional antenna means, an amplifying system tuned to an intermediate frequency having its input coupled to both said antenna means through two different channels, so that the coupling coefficient between said antenna means is substantially smaller than either of the coupling coefficients of either of said antenna means and said amplifying system, means for locally producing a current having a known and variable frequency differing from the frequency of the received radio wave by said intermediate frequency and having constant amplitude, tunable means associated with said local means, means for combining said locally produced current with the currents received by both said antenna means to thereby produce resulting currents, respectively, corresponding to said intermediate frequency, a balanced modulator circuit in one of said two channels, a variable phase-shifting means in one of said two channels, a second local means to produce a current of constant frequency and amplitude, means combining the intermediate frequency current of one of said antenna means with said second locally produced current to produce currents having frequencies equal to the sum and difference of said second locally produced current and that of the intermediate frequency current, means for combining said sum and difference frequency currents of the one antenna means with the intermediate frequency current of the other antenna means to produce a current having a frequency of said second local means, the phase and amplitude of which is a function of the direction of the incoming radio wave, indicating means connected to the output of said amplifying system and said second local means, and means connecting the tunable elements of one of said antenna means, said first local means, together with the phase-shifting means, to operate in unison and simultaneously compensate for relative variations in phase of the currents in said indicating means, and second local means with changes in frequency of the received signal over a plurality of frequency ranges, respectively.

10. In a directional antenna system, a directional antenna means having a tunable means, a non-directional antenna means having a tunable element, a tunable collective circuit having its input connected to both said antenna means through two different channels, variable means in one of said channels to control the current amplitude therein and variable phase shifting means in one of said channels for varying the phase relation between the voltage and current in said channel while maintaining the voltage constant, and means connecting said tunable means and tunable element of said antennae, said variable current amplitude control means, together with said variable phase shifting means, to operate in unison and simultaneously compensate for relative variations in the phase of the currents in said antenna means with changes in frequency of the received signal.

11. In a directional antenna system, a directional antenna means having a tunable means, a non-directional antenna means having a tunable element, a tunable collective circuit having its input connected to both said antenna means through two different channels so that the coupling coefficient between said antenna means is substantially smaller than the individual coupling coefficients between either of said antenna means and said tunable collective circuit, variable means in one of said channels to control the current amplitude therein and variable phase shifting means in one of said channels for varying the phase relation between the voltage and current in said channel while maintaining the voltage constant, and means connecting said tunable means and tunable element of said antennae, said variable current amplitude control means, together with said variable phase shifting means, to operate in unison and simultaneously compensate for relative variations in the phase of the currents in said antenna means with changes in frequency of the received signal.

12. In a direction finding device, a directional antenna means having a tunable means, a non-directional antenna means having a tunable means, an amplifying system tuned to an intermediate frequency having its input connected to both said antenna means through two different channels, means for locally producing a current having a known and variable frequency differing from the frequency of the received radio waves by said intermediate frequency and having constant amplitude, tunable means associated with said local means, means for combining said locally produced current with the currents received by both said antenna means to thereby produce resulting currents respectively, corresponding to said intermediate frequency, a balanced modulator circuit in one of said two channels, a variable phase-shifting means in one of said two channels for effecting a substantially in phase relation of the induced voltages of said antennae currents in the collector circuit and to compensate for relative variations in phase of the currents in said antennae means with changes in frequency of the received signal, a second local means to produce a current of constant frequency and amplitude, means combining the intermediate frequency current of one of said antenna means with said second locally produced current to produce currents having frequencies equal to the sum and difference of said second locally produced current and that of the intermediate frequency current, means for combining said sum and difference frequency currents of the one antenna means with the intermediate frequency current of the other antenna means to produce a current having a frequency of said second local means, the phase and amplitude of which is a function of the direction of the incoming radio wave.

13. A directional antenna system including a non-directional antenna having a tunable means, a directional antenna having a tunable means, variable resistance means associated with one of said antennae for varying the current amplitude thereof, a collective circuit having its input connected to both said antennae through two different channels and variable phase shifting means in one of said channels and capable of varying the phase relation between the current and voltage passing through said channel while maintaining the voltage thereof substantially constant, all of said means being commonly controlled and operatively linked together for simultaneously adjusting the phase and amplitude of currents in said antennae and for constantly obtaining for said aerial system a directional diagram of substantially constant shape over a substantial range of frequencies.

14. A directional antenna system including a non-directional antenna having a tunable means, a directional antenna having a tunable means, variable resistance means associated with one of said antennae for varying the current amplitude thereof, a collective circuit having its input connected to both said antennae through two different channels and a variable goniometer connected in said non-directional antenna and capable of varying the phase relation between the current and voltage of said antenna while maintaining the voltage thereof substantially constant, all of said means including said variable goniometer being commonly controlled and operatively linked together for simultaneously adjusting the phase and amplitude of currents in said antennae and for constantly obtaining for said aerial system a directional diagram of substantially constant shape over a substantial range of frequencies.

GEOFFREY G. KRUESI.